US008504672B2

(12) United States Patent
Schmidt et al.

(10) Patent No.: US 8,504,672 B2
(45) Date of Patent: Aug. 6, 2013

(54) DISCOVERY OF ELECTRONIC DEVICES IN A COMBINED NETWORK

(75) Inventors: Brian K. Schmidt, Sunnyvale, CA (US); Joerg Detert, Hannover (DE)

(73) Assignee: Silicon Image, Inc., Sunnyvale, CA (US)

( * ) Notice: Subject to any disclaimer, the term of this patent is extended or adjusted under 35 U.S.C. 154(b) by 292 days.

(21) Appl. No.: 12/950,850

(22) Filed: Nov. 19, 2010

(65) Prior Publication Data
US 2012/0131153 A1  May 24, 2012

(51) Int. Cl.
*G06F 15/173* (2006.01)
(52) U.S. Cl.
USPC ............................ 709/223; 709/217; 709/224
(58) Field of Classification Search
USPC .................. 709/223, 224, 203, 217, 219, 220
See application file for complete search history.

(56) References Cited

U.S. PATENT DOCUMENTS

| | | | | |
|---|---|---|---|---|
| 8,000,335 B2* | 8/2011 | Shiga et al. | | 370/401 |
| 2005/0027740 A1* | 2/2005 | Moritani et al. | | 707/104.1 |
| 2006/0062158 A1 | 3/2006 | Hattig | | |
| 2006/0069762 A1* | 3/2006 | Fabre | | 709/223 |
| 2006/0075100 A1* | 4/2006 | Stirbu | | 709/225 |
| 2006/0133414 A1* | 6/2006 | Luoma et al. | | 370/466 |
| 2006/0142034 A1 | 6/2006 | Wentink et al. | | |
| 2007/0162165 A1* | 7/2007 | Stirbu et al. | | 700/65 |
| 2008/0144631 A1 | 6/2008 | Park et al. | | |
| 2008/0235358 A1* | 9/2008 | Moribe et al. | | 709/220 |
| 2008/0250151 A1* | 10/2008 | Tomita | | 709/229 |
| 2009/0063686 A1* | 3/2009 | Schmidt et al. | | 709/227 |
| 2009/0094317 A1* | 4/2009 | Venkitaraman | | 709/203 |
| 2009/0125642 A1* | 5/2009 | Overby et al. | | 710/5 |
| 2009/0248909 A1 | 10/2009 | Hironaka et al. | | |
| 2010/0246502 A1* | 9/2010 | Gong et al. | | 370/329 |
| 2010/0274917 A1* | 10/2010 | Cherchali et al. | | 709/230 |
| 2010/0333209 A1* | 12/2010 | Alve | | 726/26 |
| 2011/0019623 A1* | 1/2011 | Funabiki et al. | | 370/328 |
| 2011/0114716 A1* | 5/2011 | Pratt | | 235/375 |
| 2011/0182205 A1* | 7/2011 | Gerdes et al. | | 370/254 |

OTHER PUBLICATIONS

International Search Report and Written Opinion, International Application No. PCT/US2011/060237, mailed May 29, 2012, 9 pages.
"An Introduction to Consumer Electronics Control (CEC)", 2008 HDMI Developers Conference, Taipei Taiwan, 48 pages.
"High-Definition Multimedia Interface Specification Version 1.3," HDMI Licensing, LLC, Jun. 22, 2006, 237 pages.

\* cited by examiner

*Primary Examiner* — Lashonda Jacobs
(74) *Attorney, Agent, or Firm* — Blakely Sokoloff Taylor Zafman LLP

(57) ABSTRACT

Embodiments of the invention are generally directed to discovery of electronic devices in a combined network. An embodiment of a method includes determining an identifier for a first device in a combined network according to a first network protocol, the combined network including a first network using the first network protocol and a second network using a second network protocol, where the identifier is determined based on a unique designation for the first device, and determining addressing information for the first device according to the second network protocol, where determining the addressing information includes establishing a physical address and a logical address for the first device. The method further includes broadcasting one or more messages containing identification information and capabilities of the first device to devices in the first network and to devices in the second network. The first device records and processes information from messages received by the first device, the messages being one or more messages under the first network protocol and one or more message under the second network protocol.

26 Claims, 6 Drawing Sheets

| Mapping of Combined Network 500 | | | | |
| --- | --- | --- | --- | --- |
| Devices in Combined Network 505 | | | | |
| Unique Device Identifiers 510 | Device Capabilities 515 | Relative Location 520 | Addressing Information for Device 525 | Other 530 |
| UDI1 | 00111010 | 0001 | ADD1 | . . . |
| . . . | . . . | . . . | . . . | |

Fig. 5

DISCOVERY OF ELECTRONIC DEVICES IN A COMBINED NETWORK

TECHNICAL FIELD

Embodiments of the invention generally relate to the field of electronic devices and, more particularly, to discovery of electronic devices in a combined network.

BACKGROUND

Homes and other personal spaces may include numerous electronic devices, including entertainment devices, such as televisions, video players, audio sound systems, gaming systems, personal computers, and mobile devices. Such devices are increasingly connected or networked together to allow for the transfer of data, such as multimedia data for display, between such devices.

Networks of devices may include HDMI™ (High Definition Multimedia Interface 1.4 Specification, issued May 28, 2009) data protocol and MHL™ (Mobile High-Definition Link) data protocol. MHL is an interface protocol that provides for connection of a mobile device to an HDMI display device. Such protocols allow for the transfer of high definition multimedia data between certain devices.

However, an environment may include multiple networks, depending on the relationship between devices and the capabilities of such devices. Because of the varying protocols, certain devices may connect and communicate with other devices in varying ways, thus complicating a process of identifying which devices are present in the environment and what the relationships between the devices are.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 is an illustration of an embodiment of mapping data generated by discovery of devices in a combined network.

SUMMARY

Figure 1:
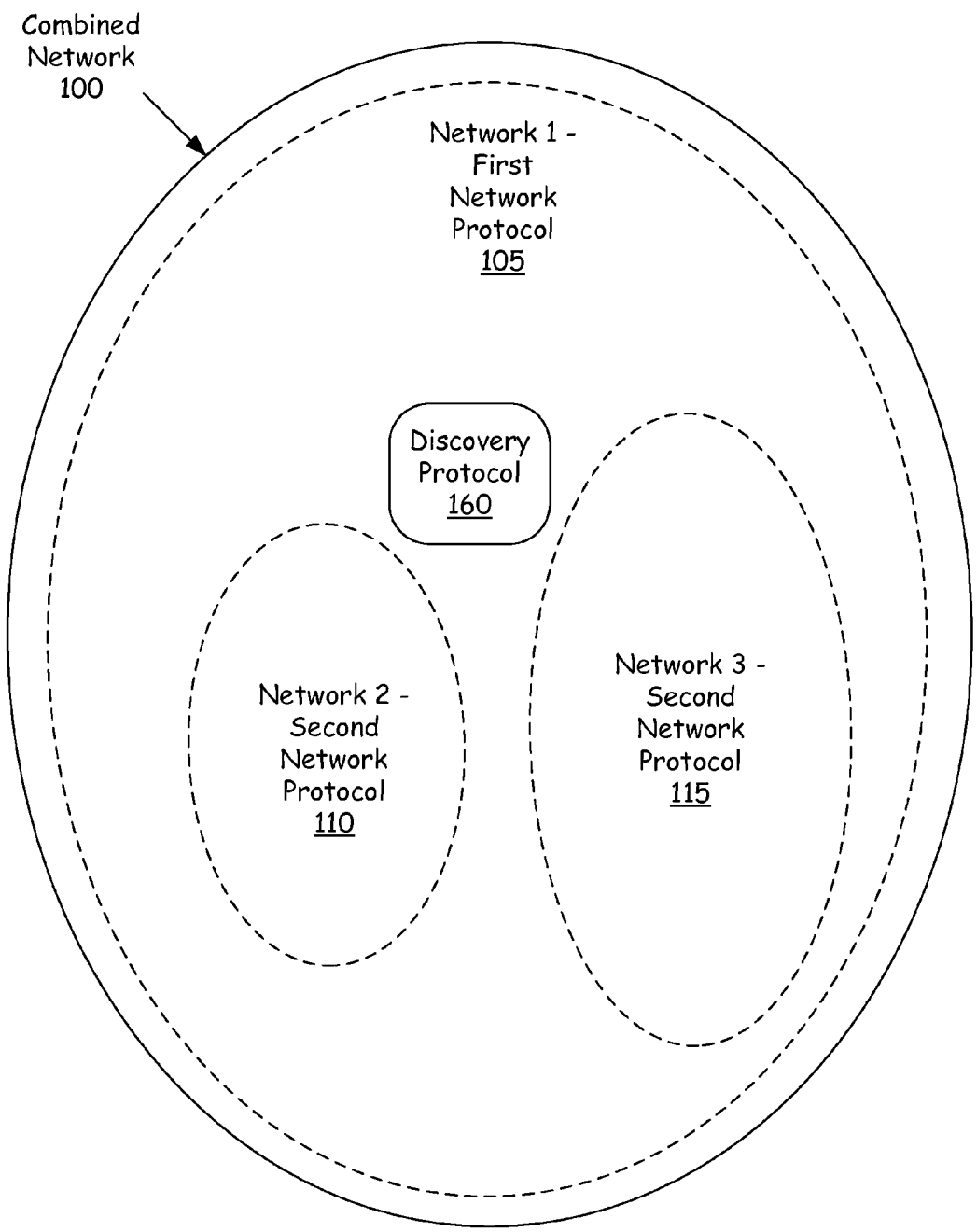
FIG. 1 is an illustration of an embodiment of a combined network allowing for discovery of devices.

Embodiments of the invention are generally directed to discovery of electronic devices in a combined network.

In a first aspect of the invention, an embodiment of a method includes determining an identifier for a first device in a combined network according to a first network protocol, the combined network including a first network using the first network protocol and a second network using a second network protocol, where the identifier is determined based on a unique designation for the first device, and determining addressing information for the first device according to the second network protocol, where determining the addressing information includes establishing a physical address and a logical address for the first device. The method further includes broadcasting one or more messages containing identification information and capabilities of the first device to devices in the first network and to devices in the second network. The first device records and processes information from messages received by the first device, the messages being one or more messages under the first network protocol and one or more message under the second network protocol.

In a second aspect of the invention, an apparatus includes a first port for connection to a first network of a combined network, the first network operating under a first network protocol, wherein the apparatus receives one or more messages broadcast from devices on the first network, each message having data including identification information and capabilities of a sending device on the first network; and a second port for connection to a second network of the combined network, the second network operating under a second network protocol, wherein the apparatus receives one or more messages broadcast from devices on the second network, each message having data including identification information and capabilities of a sending device on the second network. The apparatus further includes storage for a unique device identifier for the apparatus according to a first network protocol and addressing information for the apparatus according to a second network protocol, the addressing information including a physical address and a logical address for the apparatus; and a processor to process the information from the messages from the one or more devices on the first network and the one or more devices on the second network.

DETAILED DESCRIPTION

Embodiments of the invention are generally directed to discovery of electronic devices in a combined network.

In some embodiments, an apparatus or method is provided to identify devices present in a combined network. A combined network is a network in which devices may utilize a plurality of different protocols, such as a first network under a first network protocol and a second network under a second network protocol. The combined network may be present in a certain limited environment or area, such as a home network. In some embodiments, the network may be a consumer entertainment network, and the devices may be entertainment devices such as televisions, video players, audio sound systems, gaming systems, personal computers, and mobile devices.

In some embodiments, a first network protocol of a combined network may provide a first network convention for the identification of devices while the second network protocol may provide a second network convention for the identification of devices. In some embodiments, an apparatus or method utilizes both network conventions in a discovery process for devices in the combined network. In some embodiments, one or more devices of a combined network are compatible with a bridging protocol that is utilized to bridge the first network protocol and the second network protocol to allow for discovery of the devices within the first and second network protocols.

In some embodiments, a second network may be a network under IP (Internet Protocol) network protocol. In some embodiments, a second network may be an HDMI/CEC (Consumer Electronic Control) network in which devices are linked utilizing a CEC bus. The HDMI/CEC network may be one of multiple HDMI networks. In some embodiments, a bridging protocol bridges between the IP network protocol and the HDMI network protocol, and enables the discovery of devices in the combined network.

In some embodiments, an apparatus or method is provided to uniquely identify a set of devices, such as consumer devices, in a combined network, allowing a device that understands each of the network protocols of the network, such as CEC protocol and IP protocol, and the combined discovery protocol to determine a list of all the devices in the combined network, along with the unique device identifiers of such devices, the capabilities of each such device, the relative location of each device within the network topology, and the addressing information required to send control messages to each device. In some embodiments, the first and second network protocols provide for different identification processes for devices within the respective networks.

In some embodiments, a network utilizes a first network protocol that provides device identifiers that are based on, for example, unique addresses for each device. In some embodiments, the first network protocol does not provide for determination of the relationships between devices and the physical network topology. In an example, a second network protocol may provide identifiers that are derived from globally unique Ethernet MAC (Media Access Control) addresses or other globally unique identifier numbers if no MAC address is available for devices. In some embodiments, each such identifier is advertised in the network, such as through a periodic broadcast message over the local IP network. For example, the broadcast may be made via a UDP (User Datagram Protocol) packet containing the identification information and providing device capabilities. In this example, devices listen for the periodic broadcasts from other devices on the IP network, and store information derived from such broadcasts. In some embodiments, there is no process included in the first network protocol that provides for determining relationships between devices or physical network topology.

In some embodiments, a second network protocol may allow for determination of addressing information including logical and physical addresses of each device under such network protocol. In such operation, a logical address for each device is an address that is dependent on the type of the device and a physical address for each device is an address that describes a relative location in the network for the device. In some embodiments, the physical address is defined based on a particular root node of the appropriate cluster of devices, such as an address that describes a route from the root node to the device. In some embodiments, the second network protocol provides for determining the physical address for each device and then for determining a logical address for each device, and does not provide for establishing a globally unique address.

In some embodiments, a combined network includes a network utilizing CEC protocol as a second network protocol. In some embodiments, a network may further be compatible with MHL data protocols, where MHL is an interface protocol that provides for connection of a mobile device to an HDMI display device. CEC devices are identified by two types of addresses, the addresses being a logical address and a physical address. Both logical and physical address types are unique within a particular CEC cluster. The physical address of a CEC device identifies the path from the HDMI root node (commonly the sink or display that utilizes certain data) to the CEC device. The logical address of a CEC device identifies the device by type.

For a CEC device, the physical address is assigned during an address allocation phase, where the address allocation phase is initiated by a hot plug event (where a first device is connected to a second device) or a power on event (where a device is initially turned on or otherwise reset). Starting at the root of the HDMI tree of connected nodes, which has physical address 0, the physical address of each child node is determined by appending the port number through which the child device is connected to its parent to the physical address of the parent node. This address determination process is repeated for each additional node until all such CEC nodes have physical addresses, and thus the physical address for each node specifies the route from the root node to the device being addressed.

Logical addresses for CEC devices are assigned after the physical addresses for such devices are determined. Each CEC node chooses a logical address based on its device type, where the chosen logical address is one of a number of defined logical addresses for the device type, and the node then transmits a CEC polling message to that logical address. If the polling message is acknowledged then this indicates that the logical address is in use, and in response the CEC node chooses a different logical address of the defined logical addresses. There are certain logical addresses defined for each device type. The node retries the process of choosing a logical address until the node either identifies an unused logical address or runs out of defined addresses for the device type, in which case the node uses the undefined address as the logical address of the node.

In some embodiments, a second network protocol, such as HDMI/CEC protocol, includes a relatively small set of logical addresses, where the logical addresses may be mostly associated with pre-defined device types. In the example of HDMI/CEC protocol, to determine the set of CEC devices on a network, a CEC device will send a query to each possible logical address. If the logical address is in use, the device that owns the address will respond with its physical address. The physical address describes the path from the root of the HDMI tree to the device. This process allows the querying CEC device to build a map of the physical topology of the CEC network, the map providing a complete list of all devices in the HDMI tree and information about which devices are connected to which other devices.

However, physical and logical addresses, while being unique within a certain address tree, are not necessarily unique to other trees. For example, CEC logical and physical addresses may be duplicated in other CEC trees. In some embodiments, a device in the first network protocol may be uniquely identified by determining the address of the device and identifying the relevant address tree for the device. For example, a CEC device may be uniquely identified by determining the CEC address of the device and within which HDMI tree the CEC device is located. In some embodiments, in a combined network in which there are no globally unique identifiers in a first network protocol, a relevant address tree may be uniquely identified by a second network protocol identification of a node in that tree. In some embodiments, an HDMI tree may be uniquely identified by the second network protocol ID of the CEC device and the second network protocol ID of the second network protocol aware node with the lowest physical address in the tree.

In some embodiments, a device discovery process utilizes broadcasts by each device of its identification and a bit vector providing the device capabilities on both the first network, such as an IP network, and the second network, such as a CEC network. In some embodiments, discovery information is broadcast on the CEC network as a vendor specific CEC command containing the second network protocol identification and capability vector. In some embodiments, the command is broadcast on the CEC network only when the network changes, but is further broadcast on the IP network periodically. In some embodiments, the devices within the combined network receive these broadcasts, recording the most recent message from each node and the time the message was received.

In some embodiments, a device that supports the first network protocol, the second network protocol, and the network discovery process may combine the two network protocol systems into a map describing the topology of any node that understands both the first network protocol and the second network protocol. In some embodiments, the mapping process may be utilized to add physical layout information to the information known about combined first network protocol and second network protocol devices.

In some embodiments, in order to identify any node and its location three parameters may be utilized: a first network protocol identifier, a second network protocol logical address, and a second network protocol physical address. In some embodiments, a first multi-network protocol aware device (which is first network protocol aware and second network protocol aware) may determine that a second such multi-network aware device is in the same tree if it receives the second network protocol discovery broadcast message. In some embodiments, if the second multi-network device receives the first network protocol broadcast but not the second network protocol broadcast, then it may be determined that first network protocol device and the second network protocol device are in separate trees.

In some embodiments, the combined first network protocol and second network protocol discovery allows devices to communicate over an IP network but to be aware whether two devices are in the same local IP network, such as the same HDMI network, and thus whether they can transport data over the second network, such as carrying audio/video content over the HDMI network.

In some embodiments, the combined network protocol discovery allows the flexibility of using the multiple networks for different purposes, such as utilizing IP networking for control while utilizing the high bandwidth of HDMI networking for content delivery. In an example, the HDMI/CEC network may used for content delivery and local control within a room or cluster, while the IP or WiFi network may be utilized as an overall home network or used for control and access to the Internet at large. In some embodiments, access to the network may be made by, for example, a cell phone or a general computer, or through a gateway from a server outside the home.

FIG. 1 is an illustration of an embodiment of a combined network allowing for discovery of devices. In this illustration, a combined network 100 includes a first network (Network 1) under a first network protocol 105 and one or more networks under a second network protocol, such as a second network (Network 2) 110 and a third network (Network 3) 115. In some embodiments, the first network protocol is Internet Protocol (IP) and the second network protocol is HDMI/CEC. In some embodiments, the combined network is a consumer entertainment network, and may be limited to a certain area, such as certain household.

In some embodiments, the combined network 100 includes a combined network discovery protocol 160 that utilizes the first network protocol and the second network protocol to uniquely identify the set of devices, such as consumer devices, that are included in the combined network. In some embodiments, a device that understands each of the network protocols of the network, such as CEC protocol and IP protocol, and the combined network discovery protocol may operate to determine a list of all the devices in the combined network, along with the unique device identifiers of such devices, the capabilities of each such device, the relative location of each device within the network topology, and the addressing information required to send control messages to each device.

Figure 2:
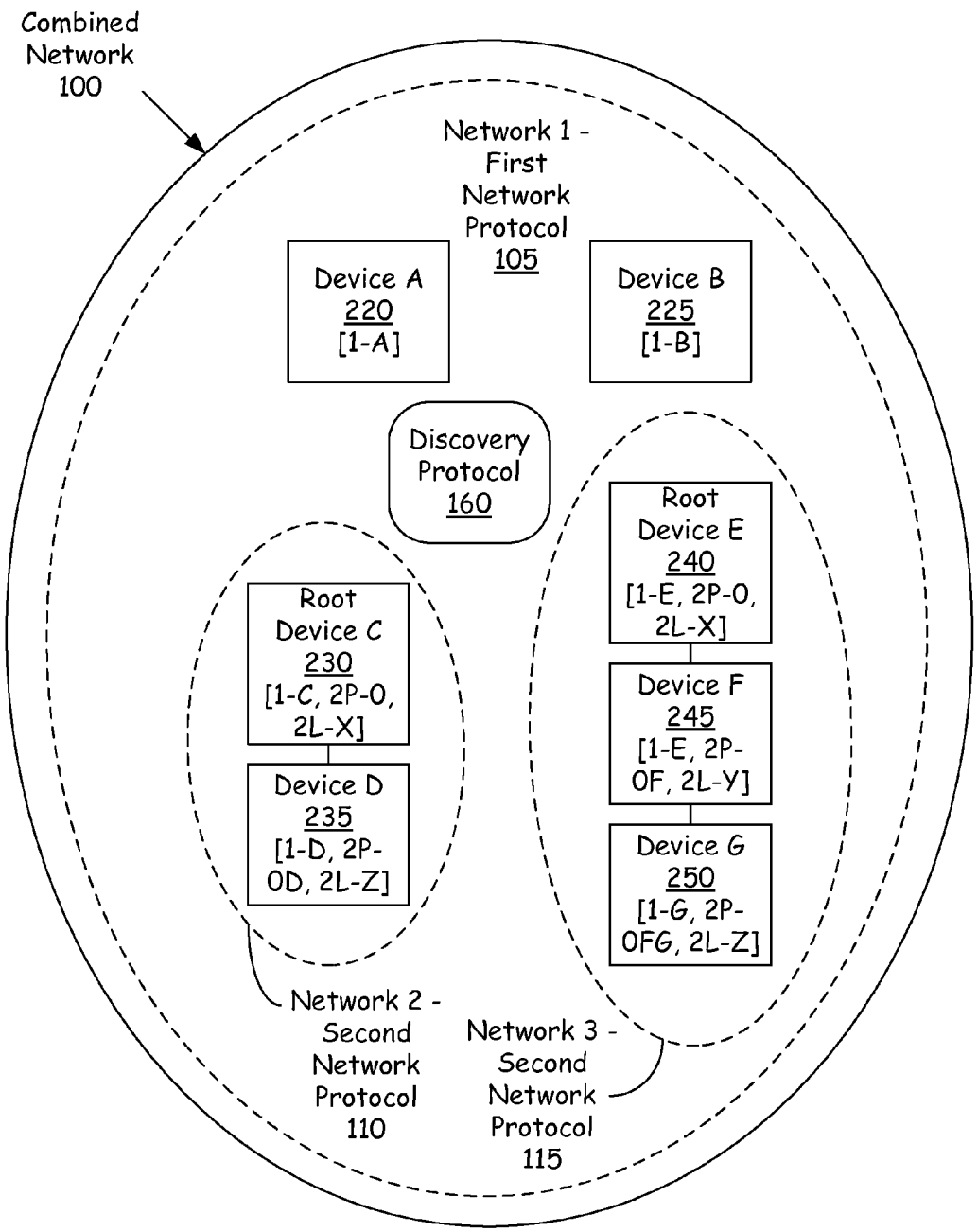
FIG. 2 is an illustration of an embodiment of a combined network allowing for discovery of devices.

FIG. 2 is an illustration of an embodiment of a combined network allowing for discovery of devices. In this illustration, the combined network 100 may be composed of a number of devices 220-250 in the first network operating under the first network protocol 105 (such as IP protocol), where certain of the devices may be operating under the second network protocol, such as a network 110 of Device C 230 and Device D 235 (which may form a first HDMI tree) in the second network 110 and Device E 240, Device F 245, and Device G 250 (which may form a second HDMI tree) in the second network 115. There may be additional devices, such as Device A 220 and Device B 225 that are not operating under the second network protocol.

In some embodiments, the combined network discovery protocol 160 may utilize the first network protocol and the second network protocol to uniquely identify devices 220-250, wherein the identification of the devices includes generating a list of all the devices in the combined network, along with the unique device identifiers of such devices, the capabilities of each such device, the relative location of each device within the network topology, and the addressing information required to send control messages to each device.

In some embodiments, the identifier for each device under the first network protocol is derived from globally unique Ethernet MAC addresses or other globally unique numbers. In this illustration, a unique identifier is established for each of the devices Device A through Device G 220-250, where for the purposes of this illustration the identifier for Device A 220 is 1-A, the identifier for Device B 225 is 1-B, and so on. However, such address designations are symbols used for simplicity in illustration, and are not intended to be in the form of actual addresses.

In some embodiments, addresses are established for each device contained in one or more networks under a second network protocol, such as HDMI/CEC. In this illustration, each of the devices is assigned a physical address and a logical address. For example, a physical address may be established based on the route from a root device to each device in the network. Assuming that Device C 230 and Device E 240 are root devices, such as television displays or other data sinks in an HDMI network, physical addresses are designated symbolically here as 2P-0 (where zero '0' is the designation for the root) for root Device C 230 and 2P-0D for Device D 235 (indicating a route from the root device to Device D). Further, physical addresses may be 2P-0 for root Device E 240, 2P-0F for Device F 245, and 2P-0FG for Device G 250 (indicating a route from the root to Device G via Device F).

In this illustration, logical addresses are then established for each device in the second and third networks 110-115. The logical address for any device may be based on the type of device. However, there may be a limited number of logical addresses available for any device type and thus the addresses are not unique between networks. For example, the devices of the second network 110 may be a logical address X (illustrated as 2L-X to indicate a logical address under the second network protocol) for device C 230 and logical address Z for device D 235. However, one or more of such logical addresses may exist in another network, such as third network 115. In an example, device C may be the same type as device E 240 and device D 235 may be the same type as device G 250. Thus, in this illustration device E 240 has logical address X, device F 245 has logical address Y, and device G 250 has logical address Z. In some embodiments, a device may use the first network protocol and the second network protocol to identify all devices in the combined network.

Figure 3:
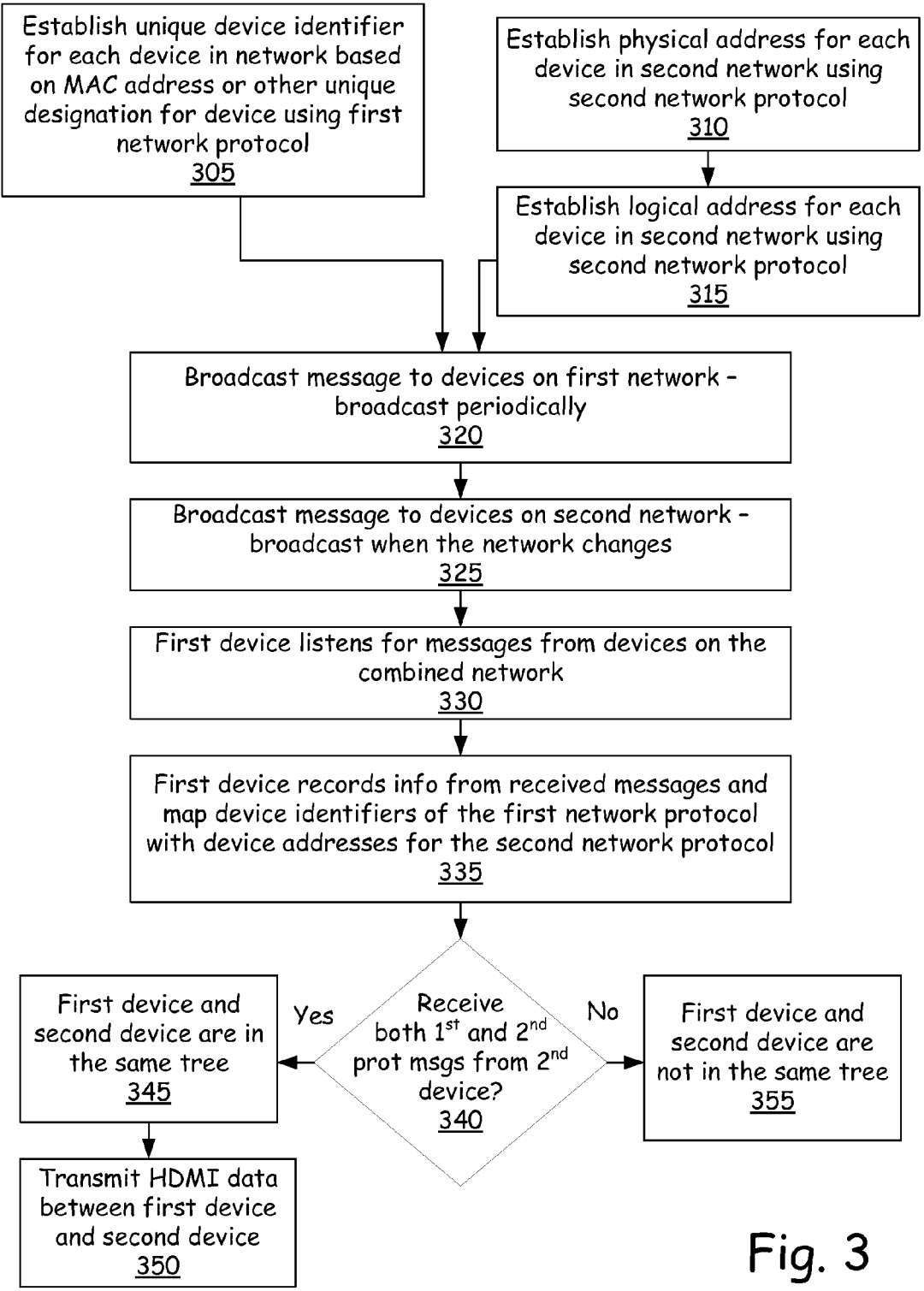
FIG. 3 illustrates a flowchart for discovery of devices in a combined network.

FIG. 3 illustrates a flowchart for discovery of devices in a combined network. In some embodiments, the combined network includes a first network under a first network protocol and one or more additional networks including a second network under a second network protocol. In this illustration, an identifier for each device is established in the first network protocol, such as by establishing a unique device identifier for each device in the combined network based upon a MAC address or other unique designation 305. Further, addressing information including a physical address 310 and a logical address 315 are established for each device in the second network using the second network protocol.

The devices in the combined network then provide broadcasts to other devices in the networks of the combined network. In this illustration, a broadcast is made by each active device in the first network to the other devices on the first network, where in some embodiments the broadcasts are made periodically 320. Further, a broadcast is made by each active device in the second network to the other devices on the second network, where in some embodiments the broadcasts are made when the second network changes 325. In some embodiments, the broadcast messages include information regarding the capabilities of the devices sending the messages.

In some embodiments, a device in the combined network operates to listen for messages from other devices on the combined network 330. Further, the device is operable to record information derived from the received messages and to map the device identifiers of the first network protocol with the device physical and logical addresses for the second network protocol 335, thereby allowing the device to generate data regarding the identifiers, addressing, relative physical location, and capabilities of the devices in the network.

The data include data regarding which network, if any, under the second network protocol a device is related. For example, the data may allow a first device to determine whether a second device is included in the same HDMI tree as the first device based on whether a message related to the relevant network is received. For example, if both a first network protocol message and a second network protocol message are received by the first device from a second device 340, this then indicates that the first and second device are within the same tree under the second network protocol 345 and may, for example, operate to exchange HDMI data between the first device and the second device 350. However, if only the first network protocol message is received by the first device from the second device this then indicates that the first device and the second device are not in the same tree 355, and thus cannot under the current structure exchange HDMI data.

Figure 4:
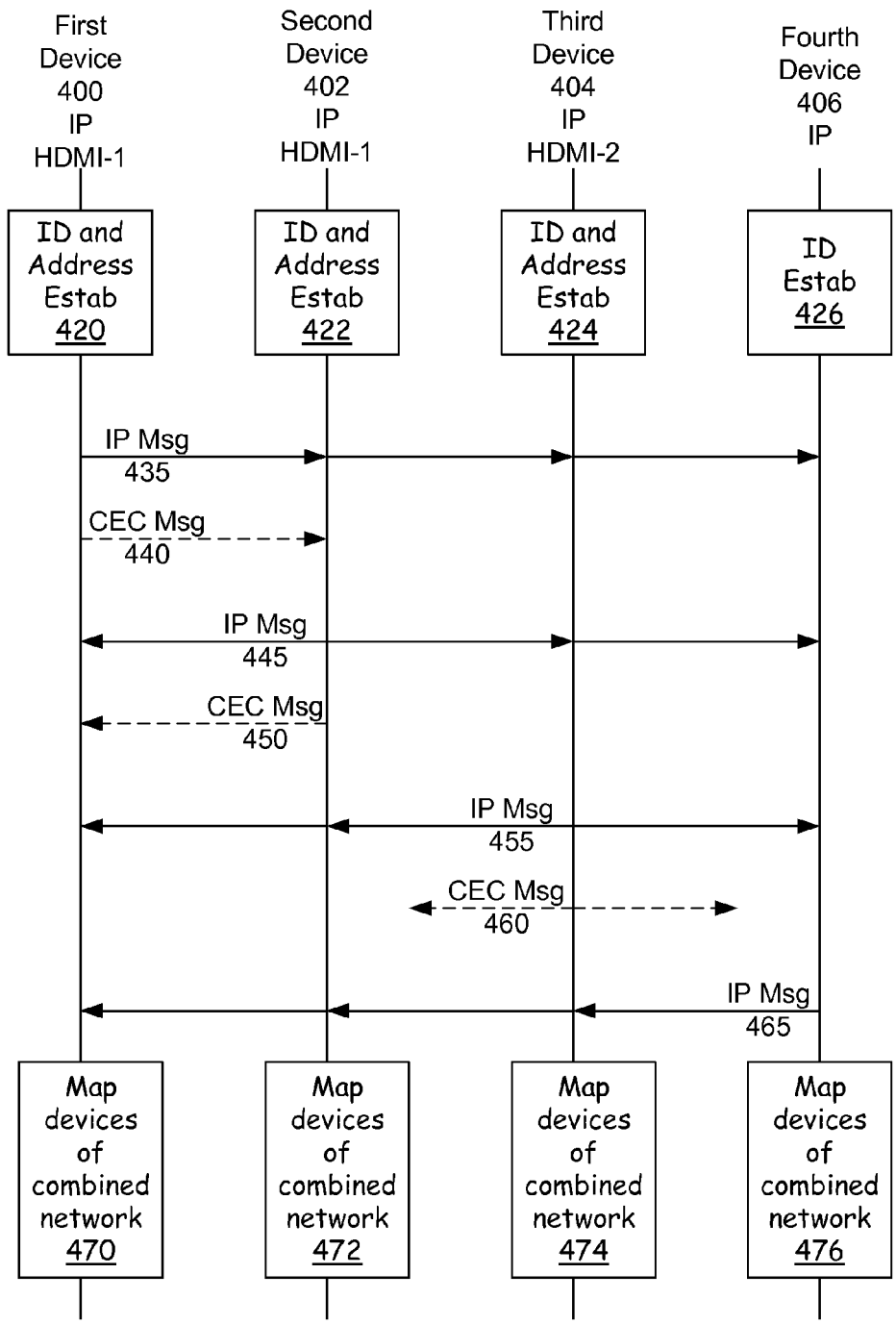
FIG. 4 is an illustration of an embodiment of messaging for discovery of devices in a combined network.

FIG. 4 is an illustration of an embodiment of messaging for discovery of devices in a combined network. In this illustration, a number of devices are present in a combined network, where the combined network includes an IP network and multiple HDMI trees. As provided in FIG. 4, a first device 400 (with determined identifier and addresses 420) is within the IP network and a first HDMI (HDMI-1) tree, a second device 402 (with determined identifier and addresses 422) is also within the IP network and the first HDMI tree, a third device 404 (with determined identifier and addresses 424) is within the IP network and a second HDMI (HDMI-2) tree, and a fourth device 406 (with determined identifier 426) is within the IP network but not within an HDMI tree.

In some embodiments, the devices send messages advertising their existence and capabilities. While the messages are shown in a certain sequence for simplicity in illustration, such messages may occur at any time and in any order. As illustrated, the first device 400 transmits an IP (first network protocol) message 435, where such message will be received by each other device in the combined network, shown here as devices 422 and 426. The first device 400 will also send a CEC message 440, but such message will only be received by those in the same first HDMI tree, which in this illustration is the second device 402. The second device 402 also transmits an IP message 445 received by each other device in the combined network and transmits a CEC message 450 received by those in the first HDMI tree, which in this illustration is the first device 400. The third device 404 transmits an IP message 455 received by each device in the combined network and transmits a CEC message 460 received by those in the same HDMI tree (HDMI-2), which are not shown in this illustration. Finally, the fourth device 406 transmits an IP message 465 but, because it is not in an HDMI tree, does not transmit a CEC message.

In some embodiments, each of the devices listens to the messages in the combined network, and, based on the received data, is able to map 470-476 the devices of the combined network, including generating data regarding the identifiers, addressing, relative physical location, and capabilities of the devices in the network. If a device is contained in an HDMI tree, the map includes the physical topology of the CEC network, the map providing a complete list of all devices in the HDMI tree and information about which devices are connected to which other devices.

FIG. 5 is an illustration of an embodiment of mapping data generated by discovery of devices in a combined network. In some embodiments, the mapping of a combined network 500, such as generated via the messages transmitted an received in FIG. 4, will include a listing of each device in the combined network 505. In some embodiments, the data generated will include unique device identifiers 510 for each device, as derived from the first network protocol; a listing of device capabilities 515 provided in transmitted messages, a relative location of each device 520 if provided using the data from the second network protocol (such as HDMI-CEC); the addressing information 525 to reach each device; and other data 530 if needed.

Figure 6:
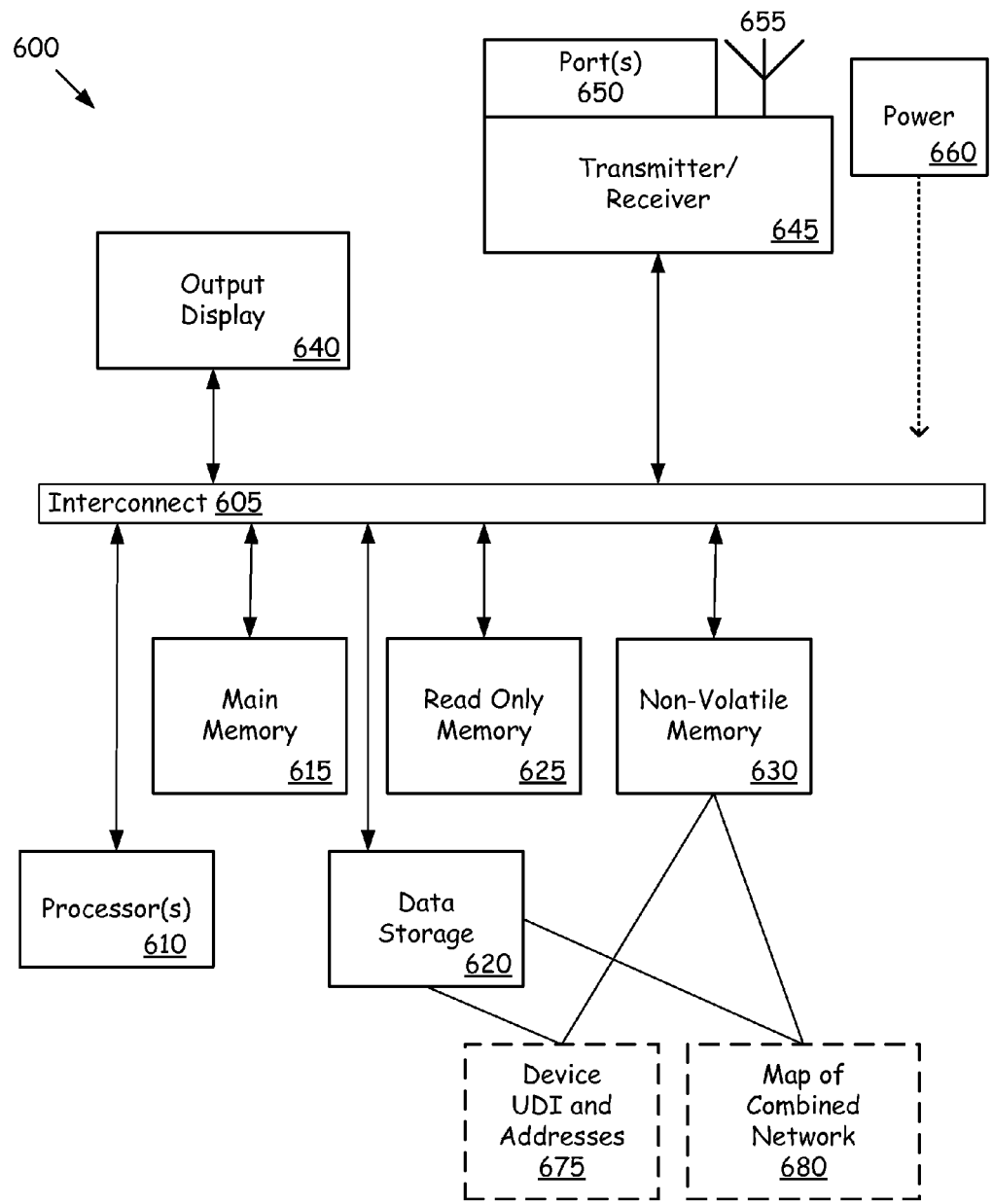
FIG. 6 illustrates an embodiment of an electronic device.

FIG. 6 illustrates an embodiment of an electronic device. In this illustration, certain standard and well-known components that are not germane to the present description are not shown. In some embodiments, the device 600 is a device in a combined network, such as a device 220-250 in combined network 100 illustrated in FIG. 2.

Under some embodiments, the device 600 comprises an interconnect or crossbar 605 or other communication means for transmission of data. The data may include various types of data, including, for example, audio-visual data and related control data. The device 600 may include a processing means such as one or more processors 610 coupled with the interconnect 605 for processing information. The processors 610 may comprise one or more physical processors and one or more logical processors. Further, each of the processors 610 may include multiple processor cores. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers. The interconnect 605 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

In some embodiments, the device 600 further comprises a random access memory (RAM) or other dynamic storage device as a main memory 615 for storing information and instructions to be executed by the processors 610. Main memory 615 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 600 also may comprise a read only memory (ROM) 625 or other static storage device for storing static information and instructions for the processors 610. The device 600 may include one or more non-volatile memory elements 630 for the storage of certain elements.

Data storage 620 may also be coupled to the interconnect 605 of the device 600 for storing information and instructions. The data storage 620 may include a magnetic disk or other memory device. Such elements may be combined together or may be separate components, and utilize parts of other elements of the device 600.

In some embodiments, the device 600 includes storage of a device UDI and possible physical and logical addresses 675 for the device as generated respectively by a first network protocol and a second network protocol. In addition, the device 600 includes storage of data regarding the combined network, as illustrated as the map of the combined network 680, as generated by the one or more processors 610 from received announcement messages from devices under the first network protocol and the second network protocol. Such address information 675 and combined network data 680 will be stored as required for access and operation of the device, which herein is illustrated as storage in, for example, data storage 620 or non-volatile memory 630.

The device 600 may also be coupled via the interconnect 605 to an output display or presentation device 640. In some embodiments, the display 640 may include a liquid crystal display (LCD or any other display technology, for displaying information or content to an end user. In some environments, the display 640 may include a touch-screen that is also utilized as at least a part of an input device. In some environments, the display 640 may be or may include an audio device, such as a speaker for providing audio information, including the audio portion of a television program.

One or more transmitters or receivers 645 may also be coupled to the interconnect 605. In some embodiments, the device 600 may include one or more ports 650 for the reception or transmission of data. The device 600 may further include one or more antennas 655 for the reception of data via radio signals, such as a Wi-Fi network. The device 600 may utilize the connections for connection to other devices in the combined network.

The device 600 may also comprise a power device or system 660, which may comprise a power supply, a battery, a solar cell, a fuel cell, or other system or device for providing or generating power. The power provided by the power device or system 660 may be distributed as required to elements of the device 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
   determining an identifier for a first device in a combined network according to a first network protocol, the combined network including a first network using the first network protocol and a second network using a second network protocol, wherein devices that are within the second network are also within the first network, and wherein determining the identifier includes establishing the identifier based on a unique designation for the first device;
   determining addressing information for the first device according to the second network protocol, wherein determining the addressing information includes establishing a physical address and a logical address for the first device;
   broadcasting using one or more transmitters one or more messages containing identification information and capabilities of the first device to devices in the first network and to devices in the second network, wherein the one or more messages include a first message broadcast according to the first network protocol including the identifier for the first device according to the first network protocol and a second message broadcast according to the second network protocol including addressing information for the first device according to the second network protocol;
   recording and processing information from messages received by the first device, the messages including one or more messages received according to the first network protocol and one or more messages received according to the second network protocol, the information being recorded in a storage of the first device, the processing being performed by a processor of the first device; and
   generating by the processor a map of devices of the combined network based upon the information from the messages received by the first device, including the messages received according to the first network protocol and the second network protocol.

2. The method of claim 1, wherein generating the map includes determining whether a second device is in the second network with the first device, wherein the determination is based on whether the first device receives both a message according to the first network protocol from the second device and a message according to the second network protocol from the second device.

3. The method of claim 1, wherein the first network protocol is IP (Internet Protocol).

4. The method of claim 1, wherein the identifier under the first network protocol for the first device is based on a MAC (Media Access Control) address of the first device.

5. The method of claim 1, wherein the second network protocol is HDMI™(High-Definition Multimedia Interface) protocol.

6. The method of claim 1, wherein the physical address is based on the device's relative position with regard to one or more other devices in the second network and establishing a logical address is based on a type of the first device.

7. The method of claim 1, wherein the physical addresses and logical addresses of the first device for the second network are not unique with regard to devices of other networks in the combined network that are also under the second network protocol.

8. An apparatus comprising:
   a first port for connection to a first network of a combined network, the first network operating under a first network protocol, wherein the apparatus receives one or more messages broadcast from devices on the first network according to the first network protocol, each of the one or more messages broadcast according to the first network protocol having data including identification information and capabilities of a sending device on the first network;
   a second port for connection to a second network of the combined network, the second network operating under a second network protocol, wherein the apparatus receives one or more messages broadcast from devices on the second network according to the second network protocol, each of the one or more messages broadcast according to the second network protocol having data including identification information and capabilities of a sending device on the second network, wherein the combined network includes the first network and the second network, and wherein devices that are within the second network are also within the first network;
   storage for a unique device identifier for the apparatus according to the first network protocol and addressing information for the apparatus according to the second network protocol, the addressing information including a physical address and a logical address for the apparatus; and
   a processor to process the information from the messages from the one or more devices on the first network and the one or more devices on the second network, wherein processing the information includes the processor to generate a listing of devices in the combined network based on the messages received according to the first network protocol and the messages received according to the second network protocol.

9. The apparatus of claim 8, wherein the first network protocol is IP (Internet Protocol).

10. The apparatus of claim 8, wherein the second network protocol is HDMI™(High-Definition Multimedia Interface) protocol, and the second network defines an HDMI tree of connected nodes.

11. The apparatus of claim 8, wherein the physical address of each device is based on the device's relative position with regard to a particular device in the second network and wherein the logical address of each device is based on a type of the device.

12. The apparatus of claim 8, wherein the listing includes the unique device identifier for each device in the combined network.

13. The apparatus of claim 12, wherein the listing further includes the physical address and logical address for each device in the second network.

14. The apparatus of claim 12, wherein the listing further includes the capabilities of each device of the combined network.

15. The apparatus of claim 8, wherein the combined network is a consumer entertainment network.

16. The apparatus of claim 8, wherein the processor to generate the listing of devices in the combined network includes determining whether a certain device is in the second network with the apparatus, wherein the determination is based on whether the apparatus receives both a message according to the first network protocol from the device and a message according to the second network protocol from the device.

17. A combined network system comprising:
a first network of a combined network having a plurality of electronic devices, the first network operating under a first network protocol;
one or more additional networks of the combined network each having one or more electronic devices, the one or more additional networks including a second network, each of the one or more additional networks operating under a second network protocol, where each of the one or more additional networks is included within the first network; and
a discovery protocol for discovery of devices in the combined network;
wherein the first network protocol provides for determining a unique identifier based on a unique designation for each device operating under the first network protocol, and wherein the second network protocol provides for determining a physical address and a logical address for each device operating under the second network protocol;
wherein each of the plurality of devices in the first network transmits messages according to the first network protocol providing identification and capability information to each other device in the first network, and wherein each of the one or more devices in the second network transmits messages according to the second network protocol providing identification and capability information to each other device in the second network;
wherein the discovery protocol includes generation b a first device of a listing of the devices in the combined network based on one or more messages received by the first device according to the first network protocol and one or more messages received by the first device according to the second network protocol.

18. The system of claim 17, wherein the first network protocol is IP (Internet Protocol).

19. The system of claim 17, wherein the second network protocol is HDMI™(High-Definition Multimedia Interface) protocol, and the second network defines an HDMI tree of connected nodes.

20. The system of claim 17, wherein the physical address of each device is based on the device's relative position with regard to a particular device in the second network and wherein the logical address of each device is based on a type of the device.

21. The system of claim 17, wherein the combined network is a consumer entertainment network.

22. The system of claim 17, wherein the generation by the first device of the listing of devices in the combined network includes determining whether a second device is in the second network with the first device, wherein the determination is based on whether the first device receives both a message according to the first network protocol from the second device and a message according to the second network protocol from the second device.

23. A computer-readable medium having stored thereon data representing sequences of instructions that, when executed by a processor, cause the processor to perform operations comprising:
determining an identifier for a first device in a combined network according to a first network protocol, the combined network including a first network using the first network protocol and a second network using a second network protocol, wherein devices that are within the second network are also within the first network, and wherein determining the identifier includes establishing the identifier based on a unique designation for the first device;
determining addressing information for the first device according to the second network protocol, wherein determining the addressing information includes establishing a physical address and a logical address for the first device;
broadcasting using one or more transmitters one or more messages containing identification information and capabilities of the first device to devices in the first network and to devices in the second network, wherein the one or more messages include a first message broadcast according to the first network protocol including the identifier for the first device according to the first network protocol and a second message broadcast according to the second network protocol including addressing information for the first device according to the second network protocol;
recording and processing information from messages received by the first device, the messages including one or more messages received according to the first network protocol and one or more messages received according to the second network protocol, the information being recorded in a storage of the first device, the processing being performed by a processor of the first device; and
generating by the processor a map of devices of the combined network based upon the information from the messages received by the first device, including the messages received according to the first network protocol and the second network protocol.

24. The computer-readable medium of claim 23, wherein generating the map includes determining whether a second device is in the second network with the first device, wherein the determination is based on whether the first device receives both a message according to the first network protocol from the second device and a message according to the second network protocol from the second device.

25. The computer-readable medium of claim 23, wherein the first network protocol is IP (Internet Protocol).

26. The computer-readable medium of claim 23, wherein the second network protocol is HDMI™ (High-Definition Multimedia Interface) protocol.

* * * * *